Dec. 24, 1968     H. P. BIRMINGHAM     3,418,584

CONTROL CIRCUIT FOR AN INDICATING DEVICE

Original Filed June 6, 1957

*INVENTOR*
HENRY P. BIRMINGHAM

BY

*ATTORNEY*

United States Patent Office 3,418,584
Patented Dec. 24, 1968

3,418,584
CONTROL CIRCUIT FOR AN
INDICATING DEVICE
Henry P. Birmingham, Washington, D.C.
(1311 Gatewood Drive, Alexandria, Va. 22307)
Original application June 6, 1957, Ser. No. 664,144, now
Patent No. 3,125,976, dated Mar. 24, 1964. Divided
and this application Aug. 31, 1959, Ser. No. 837,293
4 Claims. (Cl. 328—143)

The invention described herein may be manufactured and used by or for the Government of the United States of America for governmental purposes without the payment of any royalties thereon or therefor.

This invention relates in general to a signal control circuit and in particular to a circuit for controlling the signals applied to an indicating device.

The present application is a division of applicant's copending application Ser. No. 664,144, filed June 6, 1957, now U.S. Patent No. 3,125,976, dated Mar. 24, 1967.

In the prior art there are arrangements for controlling the movement of a craft by deriving signals that are correlates of craft operation, such as azimuth, rate of turn, and displacement, combining these signals in a linear manner to obtain a resultant signal, and applying the latter to an indicating device. Since the control units for the craft are selected for optimum operation under predetermined conditions, these arrangements have the disadvantage that the time required to make a change in depth or heading is constant and independent of the magnitude of change. A submarine, for example, may be brought under optimum operating conditions in a 10 degree dive to a 500-foot level. A 50-foot dive would require a smaller angle, say 1 degree, so that it would take substantially the same time to bring the craft down 50 or 500 feet.

Accordingly, it is an object of the present invention to provide a control circuit for an indicating device permitting optimum response of a mobile unit over a wide variety of operating conditions.

Another object is to provide a control circuit for an indicating device that will permit a mobile unit to change heading or depth without "overshooting" or "hunting."

Another object of the present invention is to provide a control circuit for an indicating device that will permit execution of a maneuver of smaller amplitude, e.g., change in heading, in a shorter period of time than one of larger amplitude.

Figure 1:
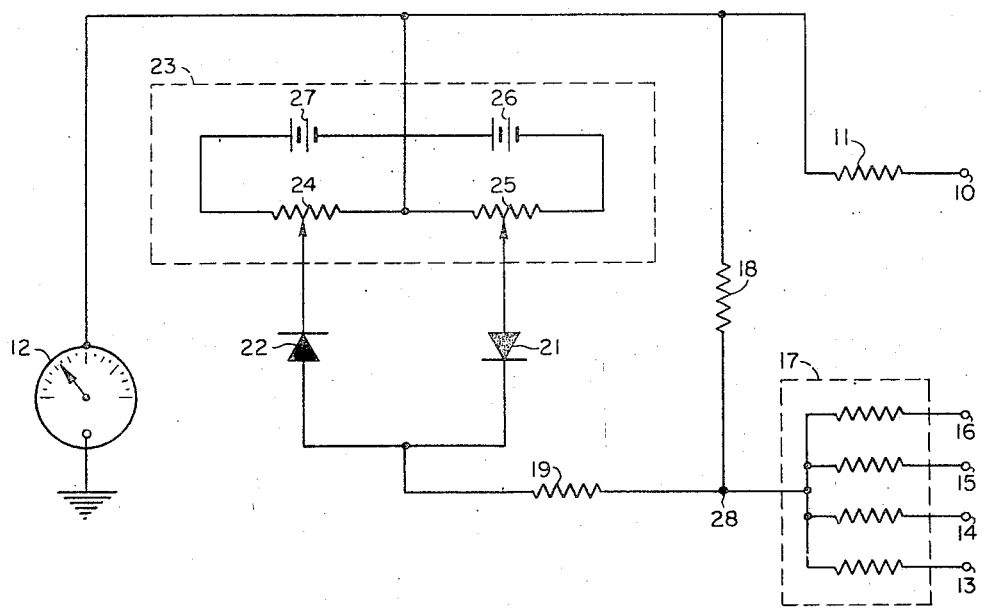

Other objects will be readily appreciated as the same becomes better understood by reference to the following detailed description when considered in connection with the accompanying drawing, wherein:

FIGURE 1 is an embodiment of the present invention.

In accordance with the present invention, signals are applied through a nonlinear circuit to an indicating device in such a manner that the response of the device is uniform until a predetermined point of operation when the rate response is greatly increased. The signals may be correlates of the variables of mobile unit operation.

Referring to FIGURE 1, terminal 10 is connected through resistor 11 and indicating device 12 to ground. Terminals 13 to 16 are connected to adding network 17, the output of which is applied to indicating device 12 through resistor 18 and through resistor 19 to unilateral impedance devices 21 and 22. The unilateral impedance devices are connected in inverse polarity. Network 23, comprising potentiometers 24 and 25 and sources of D.C. potential 26 and 27 connected in series, forms a voltage limiter since the output of the network is the difference in magnitude between the voltage across either potentiometer 24 or 25 and the voltage applied to the network from adding network 17 through either unilateral impedance devices 21 or 22. The output of network 23 is applied to indicating device 12.

Figure 2:
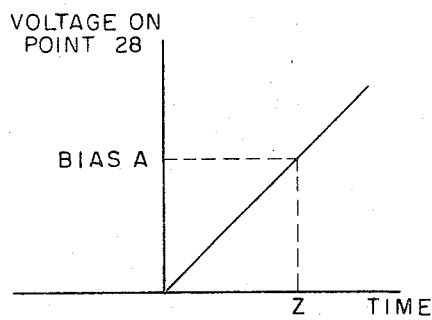
Figure 3:
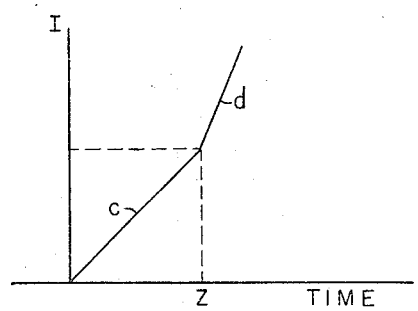

To explain the operation of the embodiment shown in FIGURE 1, reference is made to FIGS. 2 and 3. Assume that bias A, as shown in FIG. 2, is applied by potentiometers 24 and 25 to unilateral impedance devices 21 and 22. At time Z the bias voltage will be equal to the voltage applied to point 28 in FIG. 1 by adding network 17. Now referring to FIG. 3, the current through indicating device 12, due to the output of adding network 17, will increase along the slope $c$ until time Z when the increased voltage applied to indicating device 12 by network 23 will cause current through the same to increase along slope $d$.

If the signals applied to terminals 10 and 13 to 16 are correlates of variables of submarine operation, they may be representative of depth, craft angle, rate of change of craft angle, stern plane displacement, and stern control wheel displacement, respectively. By varying the bias on unilateral impedance devices 21 and 22 it is possible to control the location of the break in the curve shown in FIGURE 3. The position of the break will determine the length of time the stern and/or bow planes will act to develop craft angle, and this in turn will determine in part the slope the craft will take in moving to a desired level.

Thus, the embodiment of the invention disclosed may be used in the operation of a submarine to determine the slope of glide from one level to another. When the planesman or operator desires a certain glide-slope, he merely sets variable resistors 24 and 25 so that the resultant signal derived from adding network 17 must attain a predetermined value before indicating device 12 displays the level to which the craft is to be brought. It is apparent that, depending upon the position of the top of the potentiometers 24 and 25, the stern plane control wheel and stern planes of the submarine must be displaced to a given position for a given length of time to permit the resultant signal to build up to the required magnitude. This, in turn, will determine the craft angle and, consequently, the slope of glide from one level to another. Hence, by merely adjusting variable resistors 24 and 25 the planesman can control the slope of the glide in bringing the craft from one level to another.

Various modifications are contemplated and may obviously be resorted to by those skilled in the art without departing from the spirit and scope of the invention, as hereinafter defined by the appended claims, as only a preferred embodiment thereof has been disclosed.

What is claimed is:
1. In a signal control circuit for use in navigating a mobile craft, an indicating device having first and second indicator terminals, means connecting said second indicator terminal to ground, a unilateral impedance device having a first terminal and a second terminal, a plurality of signal sources providing signals having a selected potential value correlated to navigation functions of the craft, means for connecting said first impedance terminal to the output of some of the signal sources and the second impedance terminal to said first indicator terminal, means for providing a potential having a level corresponding to a condition in which navigation control should be exercised, means for connecting said last-mentioned means to said second impedance terminal and means for applying the output of other of said signal sources directly to the first indicator terminal.

2. In a signal control circuit for use in navigating a mobile craft, an indicating device having a first terminal and a second terminal, means connecting said second terminal to ground, a third terminal, a fourth terminal, and a pair of unilateral impedance devices, means connecting said pair of unilateral impedance devices between said third terminal and said fourth terminal in inverse polarity, first signal sources providing signals having selected potential values representative of navigation functions of the craft, means for connecting said third terminal to the output of some of said first signal sources and said fourth terminal to the first terminal of said indicating device, means for providing a potential having a level corresponding to a condition in which navigation control should be exercised, means for connecting said last-mentioned means to said fourth terminal, and means for applying the output of said signal sources directly to the first terminal of said indicating device.

3. The signal control circuit set forth in claim 2 including a second signal source and means for connecting said second signal source directly to the first terminal of said indicating device.

4. In a signal control circuit for use in navigating a mobile craft, an indicator device having a first and second terminal, means for connecting said terminal to ground, a voltage limiter including a first and second direct current potential source, a first and second potentiometer element, and a third terminal connected in series in such a manner that the first and second direct current potential sources are in the same polarity and said third terminal is located between said first and second potentiometers, a fourth terminal, first and second unilateral impedance devices, means for connecting said first unilateral impedance device between said first potentiometer and said fourth terminal and said second unilateral impedance device between said second potentiometer and said fourth terminal so that said first and second unilateral impedance devices are in inverse polarity, means for connecting said third terminal to the first terminal of said indicating device, a source of signals representative of navigation functions of the craft, means for connecting the output of said source of signals to said fourth terminal and means for applying other signals of said source of signals directly to the first terminal of said indicating device.

References Cited

UNITED STATES PATENTS

| 2,139,467 | 12/1938 | Roosenstein | 328—171 |
| 2,434,929 | 1/1948 | Holland et al. | 328—171 |
| 2,497,693 | 2/1950 | Shea | 328—171 |
| 2,703,382 | 3/1955 | Cleary | 328—171 |
| 2,861,185 | 11/1958 | Hopper | 328—171 |

RODNEY D. BENNETT, *Primary Examiner.*

D. C. KAUFMAN, *Assistant Examiner.*

U.S. Cl. X.R.

307—317, 237, 229; 328—171